(12) United States Patent
France et al.

(10) Patent No.: US 8,091,573 B2
(45) Date of Patent: Jan. 10, 2012

(54) PIPELINE INTERVENTION

(75) Inventors: Brandon Grant France, Cairo (EG);
Rodney Keith Stephens, Cairo (EG)

(73) Assignee: BP Corporation North America Inc., Warrenville, IL (US)

( * ) Notice: Subject to any disclaimer, the term of this patent is extended or adjusted under 35 U.S.C. 154(b) by 433 days.

(21) Appl. No.: 12/081,574

(22) Filed: Apr. 17, 2008

(65) Prior Publication Data

US 2009/0260695 A1    Oct. 22, 2009

(51) Int. Cl.
*F16L 55/18* (2006.01)
*B23B 41/08* (2006.01)

(52) U.S. Cl. .................... 137/15.12; 137/318

(58) Field of Classification Search ........... 137/15.14, 137/15.13, 15.12, 318, 317
See application file for complete search history.

(56) References Cited

U.S. PATENT DOCUMENTS

| | | | |
|---|---|---|---|
| 997,464 A * | 7/1911 | Metcalp | 137/318 |
| 2,736,949 A | 3/1956 | Kraemer | |
| 3,461,750 A | 8/1969 | Achelis et al. | |
| 3,703,909 A | 11/1972 | Erb | |
| 4,917,539 A * | 4/1990 | de la Salle | 137/318 |
| 5,396,814 A | 3/1995 | Tuttle et al. | |
| 5,618,137 A * | 4/1997 | Hawley et al. | 137/318 |
| 5,660,202 A * | 8/1997 | Rush et al. | 137/318 |
| 5,964,240 A * | 10/1999 | Granovski | 137/15.13 |
| 6,200,068 B1 * | 3/2001 | Bath et al. | 137/15.05 |
| 6,386,290 B1 | 5/2002 | Headworth | |
| 6,564,823 B1 * | 5/2003 | Mankins | 137/318 |
| 6,640,827 B1 | 11/2003 | McClure | |
| 6,655,406 B1 | 12/2003 | Paddock | |
| 6,736,156 B2 * | 5/2004 | Beals et al. | 137/15.04 |
| 6,811,356 B2 * | 11/2004 | Nothofer et al. | 137/15.12 |
| 6,976,498 B2 * | 12/2005 | Leppert et al. | 137/15.13 |
| 7,159,603 B2 | 1/2007 | King et al. | |
| 2005/0121091 A1 | 6/2005 | Sayers et al. | |
| 2007/0051192 A1 | 3/2007 | Penza et al. | |

FOREIGN PATENT DOCUMENTS

| | | |
|---|---|---|
| EP | 0 294 244 A2 | 12/1988 |
| GB | 2369166 | 5/2002 |
| WO | WO 00/60262 | 10/2000 |
| WO | WO 02/090814 | 11/2002 |
| WO | WO 03/067016 A2 | 8/2003 |
| WO | WO 2004/033850 | 4/2004 |
| WO | WO 2004/033850 A1 | 4/2004 |
| WO | WO 2004/039004 | 5/2004 |
| WO | WO 2006/019394 | 2/2006 |
| WO | WO 2006/041307 | 4/2006 |

OTHER PUBLICATIONS

Form PCT/ISA/220, Notification of Transmittal of the International Search Report and the Written Opinion of the Int'l Searching Authority, or the Declaration; PCT/US/2009/002373; Int'l Filing Date Apr. 16, 2009, mailed Aug. 9, 2009 (13 pgs).

(Continued)

*Primary Examiner* — Kevin Lee
(74) *Attorney, Agent, or Firm* — Nixon & Vanderhye

(57) ABSTRACT

An apparatus and method for accessing a sub sea pipeline. The apparatus comprises a entry guide (2) having a channel extending there-through for guiding a pipeline intervention device and means for attaching the entry guide to the external wall of a section of pipeline so that the longitudinal axis (b) through the centre of the channel of the entry guide forms an angle of between about 1° and 10° with the longitudinal axis (a) through the centre of the pipeline section.

5 Claims, 4 Drawing Sheets

OTHER PUBLICATIONS

Specification of Co-pending U.S. Appl. No. 12/219,699, filed Jul. 25, 2008.

"An Introduction to Surestream and to an Intrusive Flowline Intervention System", Allan Brown, 26th, (Jan. 2006).

* cited by examiner

PIPELINE INTERVENTION

The present invention relates to an apparatus and method for accessing a pipeline. More specifically, the method relates to milling into live, sub sea pipelines so that coiled tubing, electric-line (E-line), pigging and/or other, optionally autonomous, flow interventions can be conducted.

BACKGROUND OF THE INVENTION

References in this specification to 'pipelines' cover conduits such as flowlines. Also, references to 'milling' include methods of cutting into a pipeline, for example using a drill bit, mill or an abrasive jet. References to E-line cover any cable, braided line or slick line that conveys a mechanical or electrical assembly to perform various operations or take measurements.

In oil and gas production and processing, pipelines are commonly used to transport fluids such as petroleum and gas, and can be used in both surface and sub sea applications. The pipelines can be used to connect any two locations, for example a pipeline can extend between a well head and a manifold, a manifold and a production facility or a production facility and a centralised storage facility.

Pipelines can become blocked during use, for example by hydrates, wax, scale or other undesirable components present in the fluid or by equipment, such as pigs, stuck in the pipeline. Many measures are known to prevent or reduce the chance of blockage formation. One common technique is the injection of chemicals into production wells and pipelines, the chemicals acting to inhibit blockage formation. However, such injection of chemicals is expensive and blockages can still form in some cases, particularly if a pipeline is shut down causing the fluid temperature to drop.

WO 2004/033850 discloses a flow assurance system which can be used to monitor the conditions inside a flowline, to minimise the risk of blockages forming or to perform cleaning operations inside the flowline if undesirable constituents begin to build up. The system includes an inner pipe disposed within an outer pipe (the flowline). One end of the inner pipe is connected at a production facility. The other end of the inner pipe can be open to the outer pipe, for example so as to deliver chemicals through the inner pipe to a desired point in the outer pipe. In another example, the inner pipe may form a closed circuit and a hot fluid such as hot sea water can be passed through the closed loop of the inner pipe so as to warm up the fluids in the outer pipe. In yet another example, a variety of tools can be attached to the end of the inner pipe. For example, a scraper can be attached to the end of the inner pipe and the inner pipe moved through the outer pipe so that the scraper mechanically cleans the walls of the outer pipe.

The inner pipe is preferably installed into the downstream end of the outer pipe from a platform. However, the inner pipe can also access the flowline at its upstream end or at any point along the flowline.

Pipelines can extend extremely long distances, and so it is desirable to be able to access a pipeline at a desired point along the pipeline, since a blockage can form at any point. There is therefore a need for a method of accessing specific points along a pipeline.

Methods of accessing a specific point in an existing pipeline in order to connect a new pipeline to the existing pipeline without depressurising the existing pipeline are known, and are commonly described as "hot tapping" methods. WO 2006/041307 describes a hot tap clamp for use in establishing a branching point in an existing pipeline, to allow a new pipeline to be connected to the existing network. The clamp has two parts with means for fastening the parts around a section of a pipeline. There is a pipe socket integrated with and extending outwardly from one of the clamp parts. The proximal end of the pipe socket extends through the clamp part so that it abuts the surface of the pipeline when the clamp is mounted thereon. Welding equipment may then be passed into the pipe socket and used to create an internal weld, thereby sealing the pipe socket to the existing pipeline. The welding equipment is then replaced with milling equipment to remove the wall of the pipeline inside the weld. The pipe socket extends outwards from the clamp part at an angle of 90°, though the angle may be different.

However, this technique is only designed to allow fluids to enter the pipeline, and has not been designed to allow tool strings to be introduced into or removed from the pipeline. Accordingly, there is still a need for a method of milling through a pipeline to provide an entry point for tools to allow pipeline intervention operations to be conducted at any desired point which will provide the flow assurance needed.

SUMMARY OF THE INVENTION

According to the present invention, an apparatus for accessing a sub sea pipeline comprises an entry guide having a channel extending there-through for guiding a pipeline intervention device and means for attaching the entry guide to the external wall of a section of pipeline so that the longitudinal axis through the centre of the channel of the entry guide forms an angle of between about 1° and 10° with the longitudinal axis through the centre of the pipeline section. The pipeline intervention device can be a milling device for milling a window through the external wall of the pipeline section or a device for conducting operations inside the pipeline such as E-line, coiled tubing, tools mounted on an E-line or coiled tubing such as scrapers, or autonomous devices such as pods which can flow through the pipeline to collect data/measurements.

According to a second aspect of the present invention, a method of accessing a pipeline section includes providing an entry guide having a channel extending there-through for guiding a milling device, attaching the entry guide to the external wall of a section of pipeline such that the longitudinal axis through the centre of the channel through the entry guide forms an angle of between about 1° and 10° with the longitudinal axis through the centre of the pipeline section, passing a milling device along the channel of the milling device towards the external wall of the pipeline section and actuating the milling device to mill a window through the wall of the pipeline.

The invention advantageously provides an entry point which can guide coiled tubing, E-line and tools like milling devices, pods, pigs or robots along a shallow angle into the pipeline. The invention enables coiled tubing and E-lines and associated tools to be subjected to less mechanical stress and fatigue. The window formed in the pipeline wall is also much longer in the longitudinal direction of the pipeline compared with windows formed by known hot-tapping methods, due to the shallow milling angle. It is therefore easier to pass tool strings through the window formed by the method of the invention compared with prior art techniques.

The entry point can be strategically located before or after the pipeline is laid, thereby allowing interventions to be carried out at any point along a pipeline. The invention has the further benefit that the apparatus used to guide the milling device when milling a window through the pipeline also forms a connection point for subsequent pipeline intervention operations.

Additionally, the edges of the window milled through the wall of the pipeline are at an angle of between 1° and 10° to the longitudinal axis through the centre of the pipeline. Thus the edges of the window are aligned with the entry angle due to the angle of the milling operation, thereby reducing the chance of the coiled tubing, E-line or tools catching on the edges of the window.

The invention is useful to permit a variety of operations such as integrity evaluations, monitoring, repairs, maintenance, pigging assistance, fishing, flowline blockage removal etc, along a pipeline of any length. However, the invention can also be used to provide a connection point to tie in another pipeline. The shallow entry angle results in minimal turbulence as the two fluid streams combine, causing minimal erosion of the junction.

Preferably, the angle between the longitudinal axis of the channel through the entry guide and the longitudinal axis through the centre of the pipeline section is between about 1° and 5°, for example about 2°. Milling the window at these angles permits rigid tools to enter and exit the pipeline through the window. Also, coiled tubing or E-line is subjected to only a small amount of bending and therefore a small amount of mechanical fatigue as it travels through the window and aligns with the pipeline. Finally, with entry/exit angles according to the invention, the coiled tubing or E-line is subjected only to low point loading forces at the top of the window as it is being retrieved from the pipeline.

The entry guide can be tubular, such as a section of pipe, having a first end which is adjacent the point of attachment of the apparatus to the pipeline section, and an opposing second end. The entry guide is able to guide a milling device and so the channel of the entryguide can be provided with a hard surface such as with a tungsten surface. Suitably, the diameter of the channel through the entry guide is less than the diameter of the pipeline which is to be entered but is large enough to allow a tool such as a mill, nozzle, scraper, pig or evaluation tool, which may be carried on E-line or coiled tubing, to pass there-through. The length of the entry guide should be sufficient to ensure the desired milling angle is achieved and so is generally at least as long as the milling assembly.

The means for attaching the entry guide to the external wall of the section of pipeline may comprise an attaching element for attaching the entry guide to the pipeline section. For example, the attaching element may comprise a base plate around the first end of the entry guide. Preferably, the base plate is curved, the curvature of the base plate substantially matching the curvature of the external wall of the pipeline section. The base plate may be substantially hemi-cylindrical in shape. The base plate can be welded to the pipeline to secure the apparatus to the pipeline. In one embodiment, the attaching element may comprise a clamp, such as a two-part clamp and preferably a two-part cylindrical clamp, which can be tightened around the pipeline section. The base plate may form a part of the clamp. Optionally, the clamp may also be welded to the pipeline. A two-part cylindrical clamp is described in greater detail below. Clamping the apparatus to the pipeline can be advantageous in situations where welding is difficult, such as in deep waters.

A seal, such as a rubber seal, can be provided to seal the mouth of the channel at the first end of the entry guide to the external surface of the pipeline section, thereby isolating the channel from the external environment (for example, seawater) when the apparatus is coupled to the pipeline. For example, the seal may extend circumferentially around the mouth of the channel. Alternatively, the seal may be adapted to extend circumferentially around the pipeline section both upstream and downstream of the mouth of the channel.

The apparatus may include a valve at the opposing second end of the tubular entry guide. The valve may be coupled to the opposing second end of the tubular entry guide or may be provided in the channel adjacent the opposing second end. The valve is advantageously one which is operable by a remotely operated vehicle, though it could also be one which is controllable from the surface or by a diver/operator. In this way, the channel through the tubular entry guide can be isolated from the external environment by closing the valve or the valve can be opened to allow equipment to pass into and out of the channel through the tubular entry guide. A second such valve may be provided at the opposing second end to close off the tubular entry guide in the event the first valve fails.

Advantageously, the opposing second end of the tubular entry guide is provided with a supporting means which, in use, extends towards and rests on the pipeline. This provides additional stability to the tubular entry guide even if the guide is long. The supporting means may comprise a shoulder, which may be curved, for resting on the pipeline and a leg connecting the shoulder to the tubular entry guide. The shoulder can be welded or clamped to the pipeline for improved support.

Suitably, the apparatus of the present invention is provided with a control panel, optionally adapted for use by a remotely operated vehicle, to input control instructions for procedures such as opening and closing the valve, pressure testing or purging of the apparatus, as described in more detail below.

In preferred embodiments, a lubricator is coupled to the entry guide, allowing intervention tools such as a milling device, scraper or pig to be introduced into or retrieved from the channel of the entry guide under water without the unwanted flow of fluids between the external environment and the channel of the entry guide. Specifically, seawater can be prevented from entering the channel through the entry guide and therefore the pipeline, and pipeline fluids can be prevented from escaping into the external environment.

Advantageously, a fluid circulation point and/or a shear seal are positioned between the entry guide and the lubricator. The fluid circulation point is a port to which a conduit can be connected for injecting and/or withdrawing a fluid into/from the apparatus. A shear seal has a passage through which tools, E-line, coiled tubing and fluid can pass, wherein the passage can be closed to seal off the passage. Additionally, in an emergency, the shear seal can cut through E-line or coiled tubing extending through the passage and seal off the passage to provide emergency containment. The shear seal is therefore similar to a blow out preventer in a well head. Further equipment such as connectors, a seal assembly, a radial stripper or a coiled tubing guide can be included as necessary, as described below.

BRIEF DESCRIPTION OF THE DRAWINGS

The present invention will now be described, by way of example only, with reference to the accompanying drawings, in which.

DETAILED DESCRIPTION OF PREFERRED EMBODIMENTS

Figure 1:
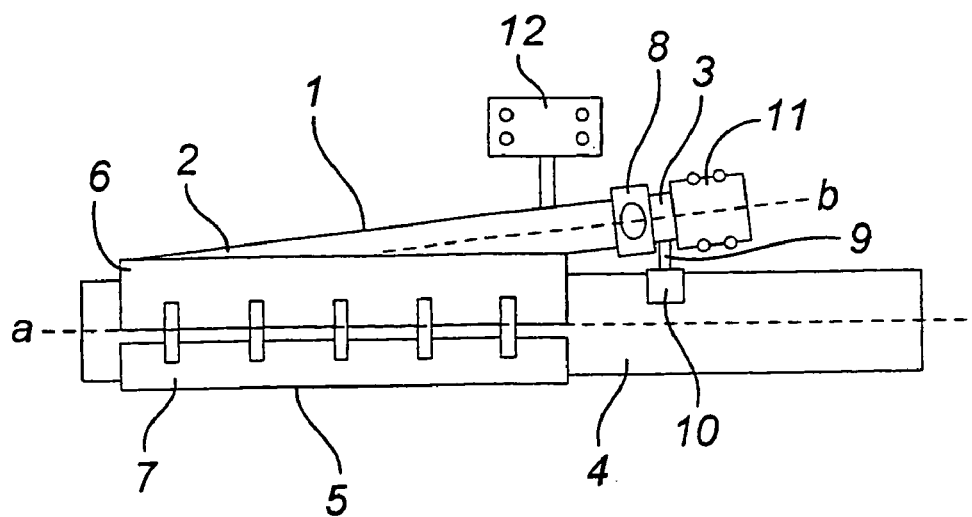
FIG. 1 shows an apparatus according to the present invention.

The apparatus shown in FIG. 1 has a tubular entry guide (1) which has a channel extending there-through, the tubular entry guide having a first end (2) adjacent the point of attachment of the apparatus to a pipeline section (4) and an opposing second end (3). The tubular entry guide (1) is coupled, generally by welding, to a two-part cylindrical clamp (5) for attaching the tubular entry guide to the pipeline section (4).

The two-part cylindrical clamp (5) has a first part (6) in the form of a hemi-cylindrical base plate around the first end (2) of the tubular entry guide (1) and a second hemi-cylindrical part (7) pivotally coupled to the first part (6) along one of its edges. There is an opening through the base plate (6) around which the first end (2) of the tubular entry guide (1) is coupled so that objects passing along the tubular entry guide (1) can pass through the base plate (6). The first (6) and second parts (7) can pivot between an open position, in which the two-part cylindrical clamp (5) can be moved into alignment with the pipeline section (4), and a closed position in which the two-part cylindrical clamp (5) can be closed concentrically around the pipeline section (4).

Each part (6,7) of the two-part cylindrical clamp (5) has a curved inner surface that matches the curvature of the external wall of the pipeline section (4). As mentioned above, each part (6,7) is generally hemi-cylindrical. Thus, when the two-part cylindrical clamp (5) is in the closed position, the two parts (6,7) define a generally cylindrical passage. In this way, the clamp (5) can be mounted concentrically around the external surface of the pipeline section (4).

The two-part cylindrical clamp (5) can have a length such that it extends approximately to the same extent as the tubular entry guide in the direction of the longitudinal axis of the pipeline section (4). However, the clamp could be longer if additional strength is required in the connection between the pipeline and the clamp, for example to resist pivoting about the support (9, 10) when a heavy entry access system (described below) is used.

The longitudinal axis (a) through the centre of the cylindrical two-part clamp (5) forms an angle of about 2° with the longitudinal axis (b) through the centre of the channel of the tubular entry guide (1). Consequently, when the apparatus is mounted on the pipeline section (4), the longitudinal axis (b) of the channel through the tubular entry guide (1) forms an angle of about 2° with the longitudinal axis (a) of the pipeline section (4).

When the apparatus is coupled to the pipeline section (4), the mouth of the channel at the first end (2) of the tubular entry guide (1) is adjacent the wall of the pipeline section (4).

The mouth of the channel has a profile that allows the tubular entry guide (1) to sit on the curved external surface of the pipeline section (4). Typically, the mouth of the channel has a saddle shaped profile. Since the channel is arranged to have its longitudinal axis (b) at an inclination of about 2° to the longitudinal axis (a) through the centre of the pipeline section (4), the mouth actually defines an elongate saddle.

There is a sealing material, such as rubber, on the inner surface of the first part (6) of the two-part cylindrical clamp (5) extending circumferentially around the mouth of the channel at the first end (2) of the tubular entry guide (1). The seal helps to prevent fluid from the outside environment (such as seawater) seeping into the channel. However, where the clamp is to be welded to the pipeline, the sealing material may be omitted.

Near the opposing second end (3) of the tubular entry guide (1) is a valve (8) which can be operated by a remotely operated vehicle (ROV) or by divers if water depth permits. The valve (8) can seal off the opposing second end (3) of the channel or can be opened to allow equipment such as a milling system to pass there-through. Such valves are available commercially, from Alco Sub-Tek, MAC Valves, BEL Valves Ltd etc.

There is also a support extending from the opposing second end (3) of the tubular entry guide (1) towards the pipeline section (4). The support has a leg (9) coupling the opposing second end (3) of the tubular entry guide (1) to a shoulder (10) which is curved for engagement with the external wall of the pipeline section (4). This support takes lateral loading, thereby supporting against sideways forces acting on the tubular entry guide (1) to provide stability to the opposing second end (3) of the tubular entry guide. The shoulder may be clamped or welded to the pipeline for additional strength.

The opposing second end (3) of the tubular entry guide (1) is terminated with a hub (11) which allows the tubular entry guide to be connected to additional pieces of equipment, as described below. A cover (not shown) can be provided on the hub (11) to close off the hub when not in use.

Optionally, a control panel (12) is mounted on the tubular entry guide (1), though this could be mounted elsewhere on the apparatus, such as on the two-part cylindrical clamp (5). The control panel (12) provides an interface which can be used by an ROV for directing fluids, pressure testing, cap installation/removal etc. The control panel (12) is provided with ports (12a) to which the ROV can connect conduits so as to feed a fluid into the ports. The ports on the control panel are in turn in fluid communication with various hydraulically operated components or with parts of the apparatus which require flushing or purging, as described in more detail below. In this way, fluid can be transmitted to those parts from the ROV. Alternatively, the control panel could have a port to which an umbilical can be connected, the umbilical extending from a vessel or platform and comprising a plurality of conduits. In this way, fluid can be transmitted from the vessel or platform, via the control panel and then to different parts of the apparatus so as to control those parts of the apparatus.

Suitably, the apparatus of the present invention is provided with an entry access system that allows a milling device or other intervention tool to be introduced into and retrieved from the tubular entry guide (1) in such a way as to prevent loss of containment of the pipeline. The entry access system comprises various components that might be found in a sub sea wellhead such as a lubricator, as described in more detail below.

Figure 2:
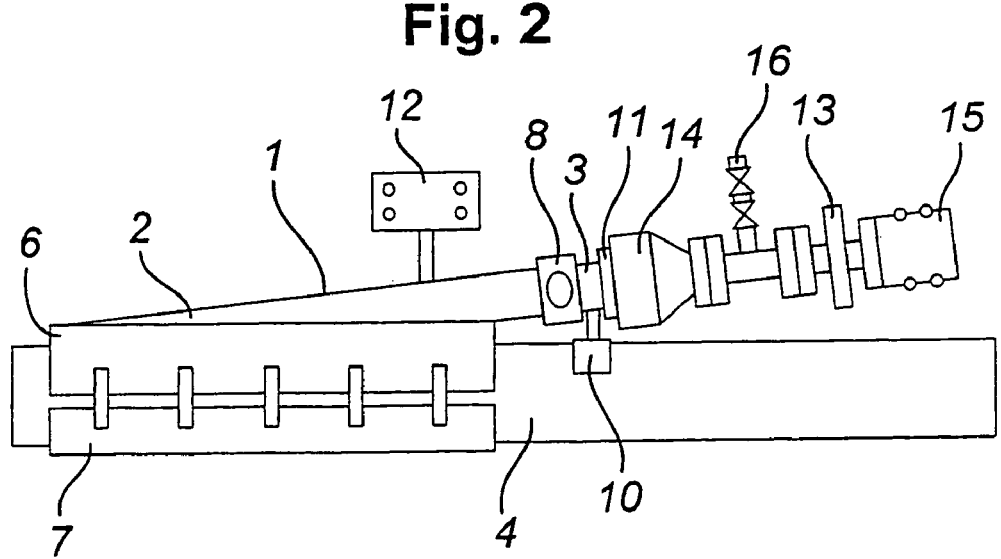
FIG. 2 shows the apparatus of FIG. 1 with entry access equipment attached thereto.

Typical entry access systems for an E-line based system and a coiled tubing based system are shown in FIGS. 2-5. As seen in FIG. 2, a shear seal (13) is coupled to the hub (11) on the tubular entry guide (1) via a connector (14). The shear seal (13) is capable of preventing fluid flow there-through and so can act as a valve, and it can also cut through the E-line or coiled tubing extending there-through so as to provide a seal in the event of an emergency. A fluid circulation point (16) is provided, to which a conduit can be connected so as to inject or withdraw fluids, as necessary, to/from the apparatus.

Figure 3:
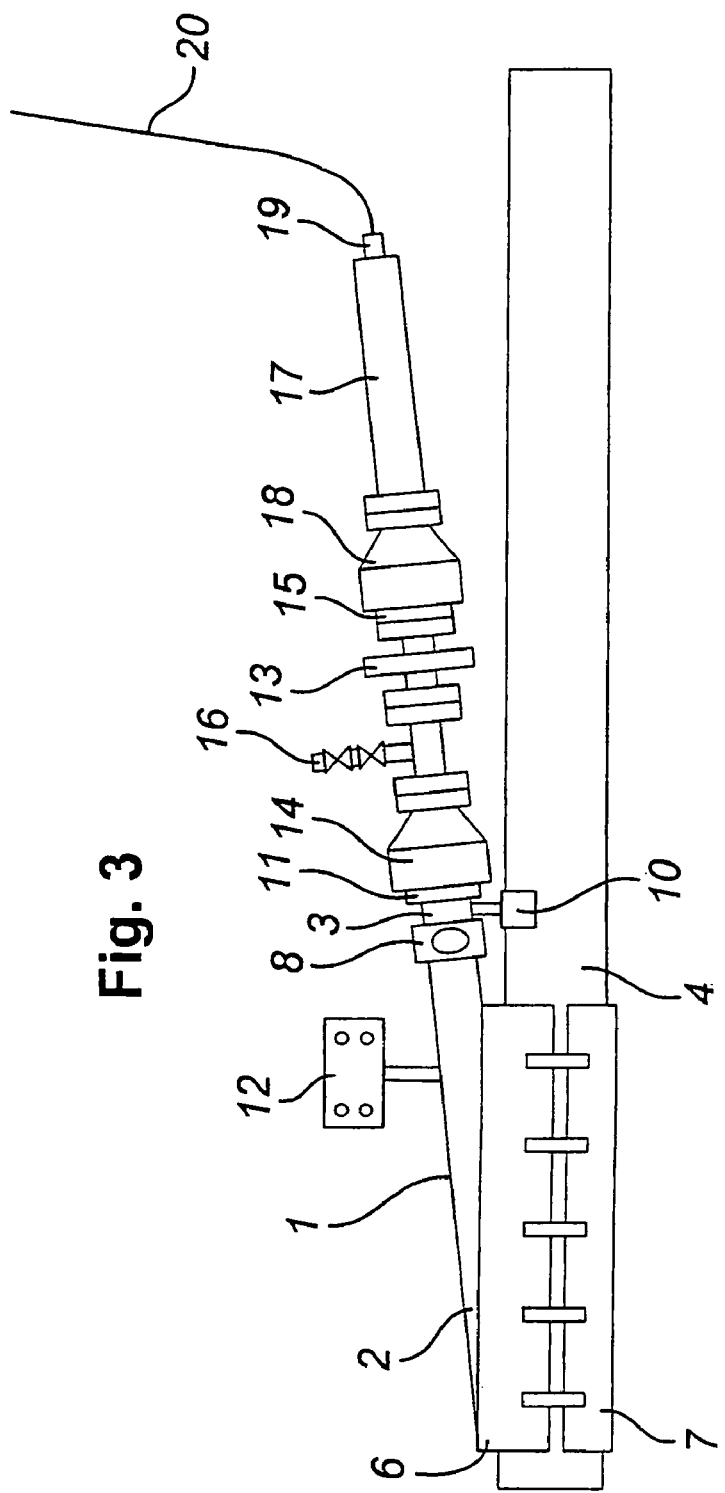
FIG. 3 shows the apparatus of FIG. 2 with yet further entry access equipment attached thereto suitable for E-line based systems.
Figure 4:
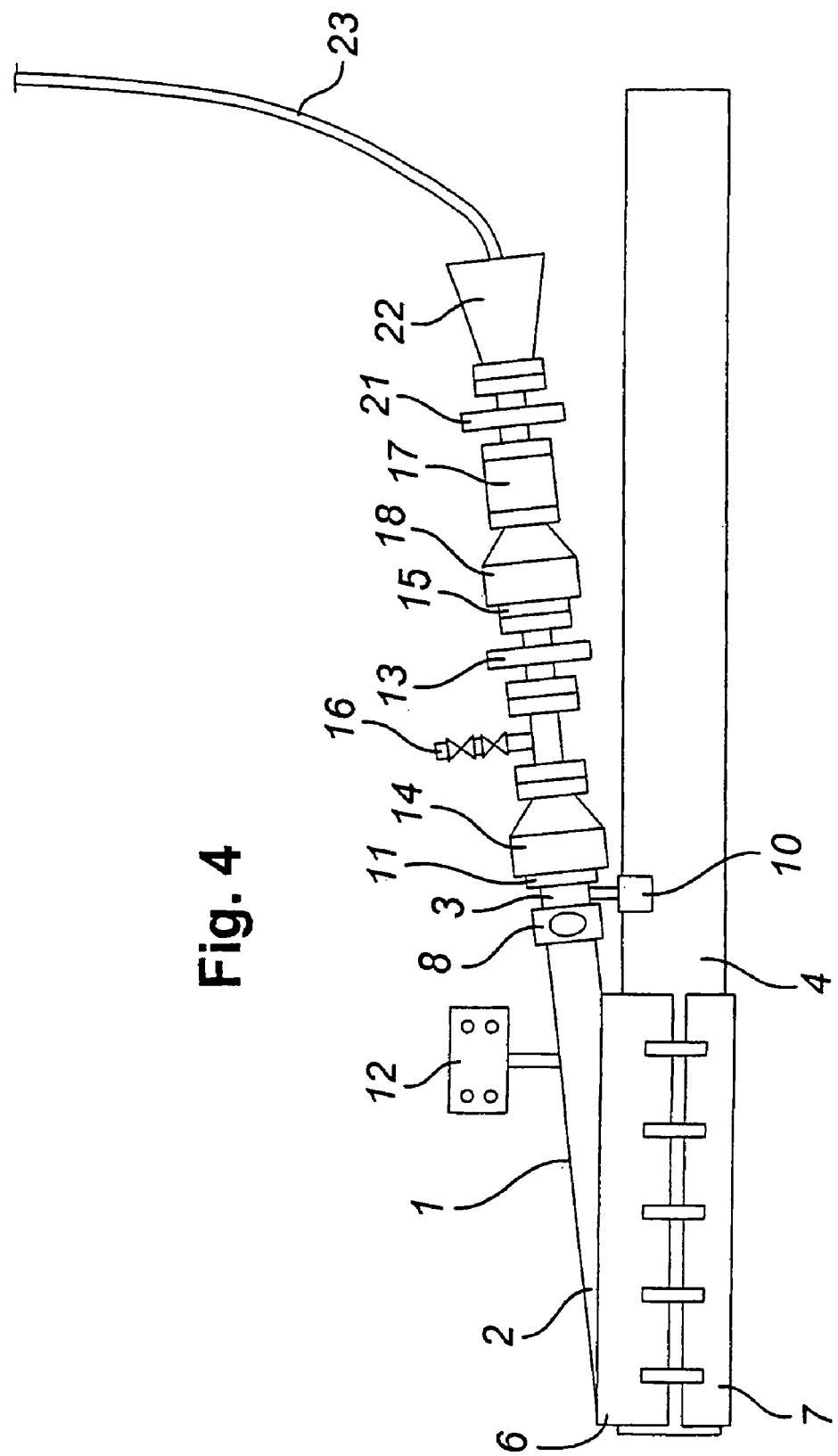
FIG. 4 shows the apparatus of FIG. 2 with yet further entry access equipment attached thereto suitable for coiled tubing based systems.
Figure 5:
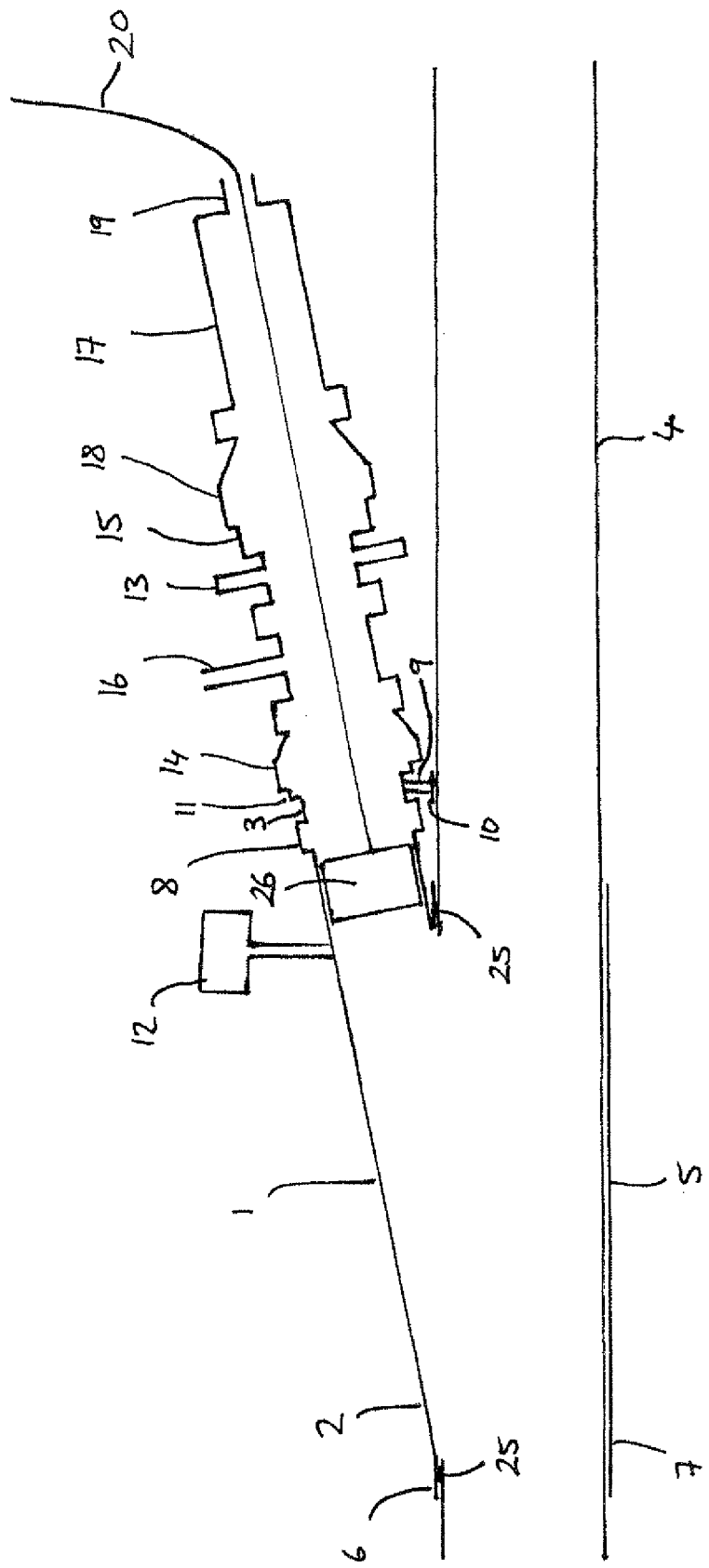
FIG. 5 is a cross-sectional view of the apparatus of FIG. 3.

As can be seen in FIGS. 3-5, a lubricator (17) is coupled to a further hub (15) on the shear seal (13) via a further connector (18). The lubricator can be many meters or even tens of meters long, since it needs to be long enough to accommodate an intervention system such as a milling system which in turn can be many meters long. It will be understood that the Figures do not shown the lubricator, or indeed the other components of the apparatus, to scale.

The connectors (14, 18) can be hydraulically operated and are therefore in fluid communication with the control panel as described above, so that they can be controlled by the ROV (or an operator in a vessel/platform).

There is a port at the top of the lubricator (not shown) that is in fluid communication with the control panel (12) to allow fluid to be flushed from the lubricator. A connector is used to connect the lubricator (17) to a seal assembly which can be a wireline seal assembly (19) in E-line based interventions (as shown in FIG. 3) or a radial stripper (21) in coiled tubing based interventions (as shown in FIG. 4). The connector allows the wireline seal assembly or the radial stripper to be detached from the lubricator and taken to the surface. Consequently, tools can be withdrawn from the lubricator and taken to the surface whilst the lubricator remains connected to the tubular entry guide. A different tool may then be lowered and inserted into the lubricator and the lubricator sealed by attaching the wireline seal assembly (19) or radial stripper (21) to the connector. A wireline based system may also be removed and replaced by a coiled tubing based system, or vice versa, in the same way.

As mentioned above, where the milling system is an E-line based milling system, as shown in FIGS. 3 and 5, the entry access system may be provided additionally with a wireline seal assembly (19) which provides a dynamic seal around the E-line (20) as it is run into or pulled out of the entry guide. Thus, the wireline seal assembly (19) maintains isolation between the internal and external environments as the E-line passes into and out of the lubricator (17). The wireline seal assembly may include one or more of a grease seal, rubber packing or other sealing device known to the person skilled in the art and available commercially, for example from FMC Technologies. A cable injector may also be used to assist in cable movement.

Where the milling tool is a coiled tubing based milling tool, instead of a wireline seal assembly, the entry access system comprises a radial type coiled tubing stripper (21) that seals around the coiled tubing (23) as it passes into the lubricator (17). A coiled tubing guide (22) is coupled to the radial type coiled tubing stripper (22) to assist the feeding or withdrawal of the coiled tubing (23). A coiled tubing injector may also be used to assist in movement of the coiled tubing through the lubricator and the tubular entry guide.

The apparatus of the present invention can be used in association with a milling system to mill a window in a section of sub-sea pipeline (4). Typically, following the milling operation, the apparatus remains in place so that it may act as a connection point for subsequent pipeline intervention operations. In addition, where the window is milled in a section of a live pipeline, the apparatus provides isolation of the live pipeline from the external environment.

To attach the apparatus to a pipeline already laid on the sea bed, the section of the pipeline (4) is first inspected to ensure that the pipeline surface is acceptable i.e. that a seal can be obtained between the pipeline section and the apparatus. The pipeline section is prepared as required, for example a pipeline coating may be removed, debris on the pipeline section may be removed and mats may be placed on the sea bed beneath the pipeline. The apparatus comprising the two-part cylindrical clamp (5) and tubular entry guide (1) is then lowered towards the pipeline section (4), for example from a vessel. The two parts (6,7) of the clamp (5) are opened, arranged around the pipeline section (4) and then closed around the pipeline section, thereby connecting the clamp to the pipeline as shown in FIG. 1.

In an alternative example, the section of pipeline may be lifted off the sea bed or even removed from the pipeline network (if possible) so that installation of the two-part cylindrical clamp (5) can be done above the sea bed or at the surface.

A seal is then formed between the apparatus and the pipeline section. Sealing techniques currently used to seal pipeline leaks may be employed. For example, an area of the two-part cylindrical clamp (5) around the mouth of the channel through the tubular entry guide (1) or the mouth itself can be welded to the pipeline section (4). Alternatively or in addition, sealing material like rubber can be arranged on the inner surface of the clamp around the mouth of the channel, and/or the two parts of the two-part cylindrical clamp can be tightened by radial contraction so as to engage the wall of the pipeline section thereby creating the seal. Slips may also be used within the clamp to help secure the apparatus. In deep water, where welding operations can be difficult, ensuring a tight fit of the clamp to create a seal is particularly useful whereas welding is useful in shallow waters.

The shoulder (10) of the support can be welded or clamped onto the pipeline section (4) to help with stabilisation of the tubular entry guide (1) if needed.

Once the seal has been created, the valve (8) at the opposing second end (3) of the tubular entry guide (1) is closed and the channel through the tubular entry guide (1), from the interface with the pipeline section (4) to the valve (8), is pressure tested. In deep waters, a ROV can be connected via a conduit to the relevant port on the ROV control panel (12) so as to put the channel through the tubular entry guide in fluid communication with a fluid source on the ROV. The fluid may be a freeze protection fluid such as glycol. The fluid is pumped to the channel to purge the seawater from the channel. Seawater purged from the channel can be disposed to the sea or collected by the ROV via appropriate ports/conduits.

Once the system has been pressure tested to satisfaction, an ROV is used to couple the fluid circulation point (16) and shear seal (13) to the tubular entry guide (1), as shown in FIG. 2. The lubricator (17) and connector are then coupled to the hub (15) on the shear seal (13) as shown in FIG. 3, again by using the ROV. A conduit is used to connect the port at the top of the lubricator (17) to the control panel (12) to aid in the purging and pressure testing process.

The E-line milling system, with the wireline seal assembly (19) mounted around the E-line cable (20), is then lowered. The milling system is introduced into the lubricator (17) and the wireline seal assembly (19) is coupled to the connector on the lubricator (17). The E-line milling system typically comprises an electric motor and a mill wherein the electric motor is capable of actuating a means for driving the mill. Typically, the means for driving the drill bit is a rotor (a rotating shaft).

Alternatively, the E-line milling system could have been previously positioned in the lubricator (17) at a location above sea level, prior to lowering the lubricator to the subsea pipeline and attachment of the lubricator to the apparatus of the present invention.

With the shear seal (13) open, the lubricator (17) is then purged and pressure tested using the ROV and the control panel (12), to ensure that the various pieces of equipment are securely connected and have integrity. Specifically, fluid, such as glycol, is pumped in from the ROV to the ROV control panel (12) and then to the fluid circulation point (16) where it flows into the lubricator. Any fluid, such as seawater, which is not to pass into the pipeline can be purged from the lubricator (17) at this point through the conduit at the top of the lubricator (17).

Next, the ROV opens the valve (8) on the tubular entry guide (1) to allow the milling system entry into the channel of the tubular entry guide. The mill is then activated and a window is milled through the wall of the pipeline section at an angle of about 2° relative to the central longitudinal axis (a) through the pipeline section. Once the mill has broken through the wall of the pipeline section, a fluid flow path exists and so a milling fluid may be injected from the ROV, via the ROV control panel (12), through the fluid circulation point (16), into the tubular entry guide (1) and then into the pipeline so as to flush the cuttings into the pipeline. A typical milling fluid is glycol.

The mill bit can be one which is hydraulically or electrically powered. Both types of systems are known in the field.

It is important to support the various components during the milling process. For example, the support extending from the opposing second end (3) of the tubular entry guide (1) provides support for the opposing second end (3) as well as for the entry access system that is connected to it. The two-part cylindrical clamp (5) is supported against movement along the direction of the pipeline section (4) and movement from side to side (lateral movement). This is accomplished by a series of slips designed to grip the external wall of the pipeline section.

After milling the window, the milling system is withdrawn back into the lubricator (17) and the ROV closes the valve (8) on the tubular entry guide (1). Hydrocarbons which may have passed from the pipeline (4) into the lubricator (17) are flushed out by feeding a fluid such as glycol through the fluid circulation point (16) and purging the hydrocarbons through the conduit at the top of the lubricator (17). The purged fluid can be collected in a receptacle or redirected via the ROV control panel (12) back into the tubular entry guide (1) and thus to the pipeline section (4).

If no further pipeline intervention is to be carried out at this stage, the entry access equipment, such as the shear seal (13), lubricator (17) and wireline seal assembly (19), are disconnected and a connector cap is installed on the hub (11) at the end of the tubular entry guide (1).

If further tool runs are needed, once the lubricator has been purged, the shear seal (13) is closed to isolate the lubricator (17) from the rest of the apparatus. The wireline seal assembly (19) can then be detached from the lubricator (17) and the milling system can be removed from the lubricator. The next tool can then be lowered and introduced into the lubricator.

For example, a venturi junk basket and/or magnets can be introduced to retrieve the mill cuttings that were flushed into the pipeline section during milling. The venturi junk basket and/or magnets are introduced into the pipeline section (4) through the lubricator (17) and tubular entry guide (1) using the method described above.

Further pipeline interventions using equipment such as coiled tubing cleanout assemblies, E-line tractors, cameras or autonomous tools/pads etc. can then be introduced. The intervention tool is passed through the apparatus in the same manner as described above, i.e. it is introduced into the lubricator (17) which is then purged and pressure tested, the valve (8) on the tubular entry guide (1) is opened by the ROV and then the intervention device is passed through the window and into the pipeline.

In another embodiment, rather than using E-line based milling and/or pipeline intervention systems, a coiled tubing milling system or a coiled tubing pipeline intervention system can be used, as shown in FIG. 4. In this case, the method is largely as described above with respect to E-line based milling, although a radial type coiled tubing stripper (21) and coiled tubing guide (22) are coupled to the lubricator (17) instead of the wireline seal assembly (19). Optimum procedures use slick coiled tubing assemblies. Due to their uniform cross-section, these can avoid hang-up issues and so are particularly advantageous.

It can be seen that the invention simultaneously provides for the remote formation of a window into a section of pipeline, the simultaneous remote installation of a connector for allowing further pipeline intervention operations, and the remote handling of such pipeline intervention operations. The 2° angle of entry into the pipeline is very shallow and so helps ensure smooth running of the E-line/coiled tubing and also reduces the chance of subsequent E-line or coiled tubing well intervention equipment catching on the edges of the window. The low angle of entry also minimises the amount of mechanical fatigue the coiled tubing or E-line experiences and it minimises the amount of force required to advance or retrieve the tool string.

The above description relates to sub-sea use of the invention. However, it is also contemplated that the apparatus could be installed on a section of pipeline and optionally used to create a window before the section of pipeline has been laid on the seabed. In this way, a pipeline can be laid which is already provided with a plurality of access points suitable for allowing pipeline intervention operations. For example, after the window has been milled in the pipeline section, the valve on the tubular entry guide is closed and a cap may be placed on the opposing second end of the tubular entry guide to act as a secondary barrier to isolate the tubular entry guide. The pipeline section can then be laid. At a later date, if an intervention operation at that point along the pipeline is required, the cap can be removed and the intervention can be carried out as described above.

The invention claimed is:

1. A method of accessing a pipeline section comprising:
providing an entry guide having a channel extending therethrough for guiding a milling device,
attaching the entry guide to an external wall of a section of pipeline such that the longitudinal axis (b) through the centre of the channel of the entry guide forms an angle of between about 1° and 10° with the longitudinal axis (a) through the centre of the pipeline section,
passing a milling device along the channel of the entry guide towards the external wall of the pipeline section,
actuating the milling device to mill a window through the wall of the pipeline section,
withdrawing the milling device from the channel of the entry guide, and then
passing another intervention device through the channel of the entry guide, through the window formed by the milling device and into the pipeline for conducting an intervention within the pipeline, the intervention device being a tool carried on coiled tubing.

2. A method according to claim 1, in which the angle between the longitudinal axis (b) through the centre of the channel of the entry guide and the longitudinal axis (a) through the centre of the pipeline section is about 2°.

3. A method according to claim 1, in which a valve is provided on the entry guide, and further comprising the step of releasably coupling a fluid circulation point for injecting and/or withdrawing a fluid, a shear seal and a lubricator to the entry guide, opening the valve on the entry guide and passing the milling device into the lubricator, through the shear seal and fluid circulation point and then into the channel of the entry guide.

4. A method according to claim 1, in which the milling device is mounted on the end of an electric line or a coiled tube.

5. A method according to claim 1, conducted using a remotely operated vehicle.

* * * * *